(12) United States Patent
Wang

(10) Patent No.: US 8,904,010 B2
(45) Date of Patent: Dec. 2, 2014

(54) METHOD FOR ALLOCATING VIRTUAL LOCAL AREA NETWORK RESOURCES BY MAPPING VSAN IDS TO MAC ADDRESSES AND RELATED FCOE DEVICE AND FCOE SYSTEM

(75) Inventor: Xiaodong Wang, Beijing (CN)

(73) Assignee: Hangzhou H3C Technologies Co., Ltd., Zhejiang (CN)

( * ) Notice: Subject to any disclaimer, the term of this patent is extended or adjusted under 35 U.S.C. 154(b) by 290 days.

(21) Appl. No.: 13/387,313

(22) PCT Filed: Dec. 23, 2010

(86) PCT No.: PCT/CN2010/080189
§ 371 (c)(1),
(2), (4) Date: Jan. 26, 2012

(87) PCT Pub. No.: WO2011/076136
PCT Pub. Date: Jun. 30, 2011

(65) Prior Publication Data
US 2012/0254440 A1    Oct. 4, 2012

(30) Foreign Application Priority Data
Dec. 23, 2009   (CN) .......................... 2009 1 0262047

(51) Int. Cl.
| G06F 15/16 | (2006.01) |
| G06F 15/173 | (2006.01) |
| H04L 12/46 | (2006.01) |
| H04L 29/12 | (2006.01) |

(52) U.S. Cl.
CPC .......... *H04L 12/4645* (2013.01); *H04L 61/103* (2013.01); *H04L 29/12839* (2013.01); *H04L 29/12886* (2013.01); *H04L 61/6045* (2013.01); *H04L 61/6022* (2013.01); *H04L 29/12028* (2013.01)

USPC .......................... 709/226; 709/236; 709/245

(58) Field of Classification Search
CPC ... H04L 49/90; H04L 49/357; H04L 61/6045; H04L 12/4779
USPC .......................................... 709/245, 226.236
See application file for complete search history.

(56) References Cited

U.S. PATENT DOCUMENTS 7,606,939 B1    10/2009  Finn
8,270,420 B2 *  9/2012   Wang et al. .................. 370/401

(Continued)

FOREIGN PATENT DOCUMENTS

| CN | 1741499 | 3/2006 |
| CN | 1905504 | 1/2007 |
| EP | 1630656 | 3/2006 |

OTHER PUBLICATIONS

CN First Office Action dated Sep. 13, 2012 issued on CN Patent Application No. 200910262047.4 filed on Dec. 23, 2009, The State Intellectual Property Office, P.R. China.

(Continued)

*Primary Examiner* — Larry Donaghue

(57) ABSTRACT

A method for allocating VLAN resources, an FCoE device and an FCoE system. A first device maps a virtual storage area network identity (VSAN ID) corresponding to a fiber channel (FC) message into a media access control (MAC) address according to a preset relation. The first device obtains a VLAN ID corresponding to the VSAN ID according to the preset relation and encapsulates the MAC address and the VLAN ID into an Ethernet message corresponding to the FC message. The preset relation is used for mapping multiple VSAN IDs, which correspond to the same VLAN ID, into different MAC addresses.

13 Claims, 3 Drawing Sheets

(56) References Cited

U.S. PATENT DOCUMENTS

| | | | |
|---|---|---|---|
| 2005/0018673 | A1 | 1/2005 | Dropps et al. |
| 2005/0044199 | A1 | 2/2005 | Shiga et al. |
| 2006/0251067 | A1* | 11/2006 | DeSanti et al. ............... 370/389 |
| 2008/0028096 | A1 | 1/2008 | Henderson et al. |
| 2008/0056300 | A1* | 3/2008 | Williams ...................... 370/466 |
| 2009/0092141 | A1 | 4/2009 | Banerjee |
| 2009/0132701 | A1 | 5/2009 | Snively |
| 2009/0245791 | A1* | 10/2009 | Thaler et al. ..................... 398/45 |
| 2010/0104280 | A1* | 4/2010 | Carlson et al. .................. 398/45 |
| 2010/0115132 | A1* | 5/2010 | Hirata et al. ................... 709/245 |
| 2011/0064086 | A1* | 3/2011 | Xiong et al. ................... 370/401 |
| 2011/0299539 | A1* | 12/2011 | Rajagopal et al. ....... 370/395.53 |

OTHER PUBLICATIONS

International Search Report and Written Opinion for PCT Application No. PCT/CN2010/080189. Chinese Intellectual Property Office, Mar. 31, 2011.

Extended European Search Report dated Aug. 21, 2014, EP Patent Application No. 10838699.6 dated Dec. 23, 2010, European Patent Office.

* cited by examiner

| bit Word | 31 30 29 28 27 26 25 24 | 23 22 21 20 19 18 17 16 | 15 14 13 12 11 10 9 8 7 6 5 4 3 2 1 0 |
|---|---|---|---|
| 0 | Type=0fh | Length | Map Number |
| 1 | VSAN ID | | VLAN ID |
| 2 | Reserved | (MSB) | FCoE-VSAN-MAPPING MAC (LSB) |
| 3 | VSAN ID | | VLAN ID |
| 4 | Reserved | (MSB) | FCoE-VSAN-MAPPING MAC (LSB) |
| 5 | VSAN ID | | VLAN ID |
| 6 | Reserved | (MSB) | FCoE-VSAN-MAPPING MAC (LSB) |

METHOD FOR ALLOCATING VIRTUAL LOCAL AREA NETWORK RESOURCES BY MAPPING VSAN IDS TO MAC ADDRESSES AND RELATED FCOE DEVICE AND FCOE SYSTEM

CLAIM FOR PRIORITY

The present application is a national stage filing under 35 U.S.C 371 of PCT application number PCT/CN2010/080189, having an international filing date of Dec. 23, 2010, which claims priority to Chinese Patent Application No. 200910262047.4, filed on Dec. 23, 2009, the disclosures of which are hereby incorporated by reference in their entireties.

BACKGROUND OF THE INVENTION

Fibre channel (FC) protocol is a transmission protocol with high performance applied in a storage area network (SAN). For a FC network, the whole network can be divided into multiple virtual storage area networks (VSAN) using a virtual fabric technique, wherein different VSANs are logically separated and not able to provide data access to each other. Since different VSANs are isolated from one another, FC-ID addresses of devices in different VSANs can overlap.

Fibre Channel over Ethernet (FCoE) is a technology for bearing FC protocol over Ethernet. A switch for supporting FCoE protocol is called a FCoE Forwarder (FCF), and a communication entity device supporting FCoE protocol is called an Ethernet node (ENode). For example, the ENode can be a server or a disk array, etc.

Referring to FIG. 1, FIG. 1 is a schematic diagram illustrating a conventional FCoE network. In FIG. 1, the whole network is divided into 2 VSANs, i.e. VSAN 1 and VSAN 2. An ENode within a VSAN can only access other ENodes of the same VSAN. Each of FCF switch1 101 and FCF switch2 102 has two F ports. Access VSAN IDs of the two ports of each switch are configured as VSAN1 and VSAN2. Furthermore, an E port is configured as a Trunk of VSAN1 and VSAN2.

When an FCF switch receives an FC message transmitted from an ENode (which can be any of Server1 103, Server2 104, Disk array1 105 and Disk array2 106), it needs to encapsulate the FC message into an Ethernet message. FC messages from different VSANs may be transmitted in the same Ethernet link. On the FC protocol layer, different VSAN IDs are used for identifying FC messages from different VSANs. On the Ethernet protocol layer, in order to avoid message address conflict and to guarantee safety, there is a need to distinguish FC messages from different VSANs.

In order to obtain the above mentioned object, in the existing FCoE protocol, different VSANs in the FC protocol are mapped into different VLANs in an Ethernet, thereby forming one-to-one correspondence between the VSANs and the VLANs (that is, VSAN IDs and VLAN IDs have one-to-one correspondence). Therefore, FC messages from different VSANs can be isolated in an Ethernet due to isolation of Ethernet messages among different VLANs. However, there is one-to-one correspondence between VSANs and VLANs, and so each VSAN requires a dedicated VLAN which may be a waste of VLAN resources.

DETAILED DESCRIPTION OF THE INVENTION

The following example provides a method for allocating VLAN resources (e.g. VLAN ID). In this method, multiple VSANs are mapped into the same VLAN during a FC initialization protocol (FIP) interaction procedure. Therefore, it is possible to transmit messages of different VSANs within the same VLAN. Since FC-IDs of devices in different VSANs may overlap, a relation between VSAN IDs and corresponding VLAN IDs and mapping MAC addresses (also called MAC mapping addresses) is set beforehand. This helps to ensure that MAC addresses within the same VLAN, into which FC-IDs used in different VSANs are mapped, do not overlap. Specifically, each VSAN ID corresponds to a VLAN ID and a MAC mapping address. Based on a VLAN ID and a MAC mapping address, the corresponding VSAN ID can be found. Also, a VSAN ID can be used to find its corresponding VLAN ID and corresponding MAC mapping address. A procedure for obtaining the MAC address according to a preset relation when encapsulating an FC message into an Ethernet message may comprise the following steps. First using the VSAN ID contained in the FC message to obtain the corresponding VLAN ID and MAC mapping address. Then setting the FC-ID of the FC message as low 24 bits of the MAC address, and setting the obtained MAC mapping address as high 24 bits of the MAC address. This forms a MAC address with 48 bits. In this way, even if devices in different VSANs have the same FC-ID, the 48-bit MAC addresses mapped from the FC-IDs are different due to the difference between MAC mapping addresses corresponding to different VSANs. The 48-bit MAC addresses are different even if the VSANs correspond to the same VLAN. Accordingly, the issue of address overlapping in the same VLAN can be avoided. In one example, a MAC mapping address can be an FCoE-VSAN-MAPPING MAC address.

Examples will be described in detail hereinafter with reference to the drawings.

Figure 1:
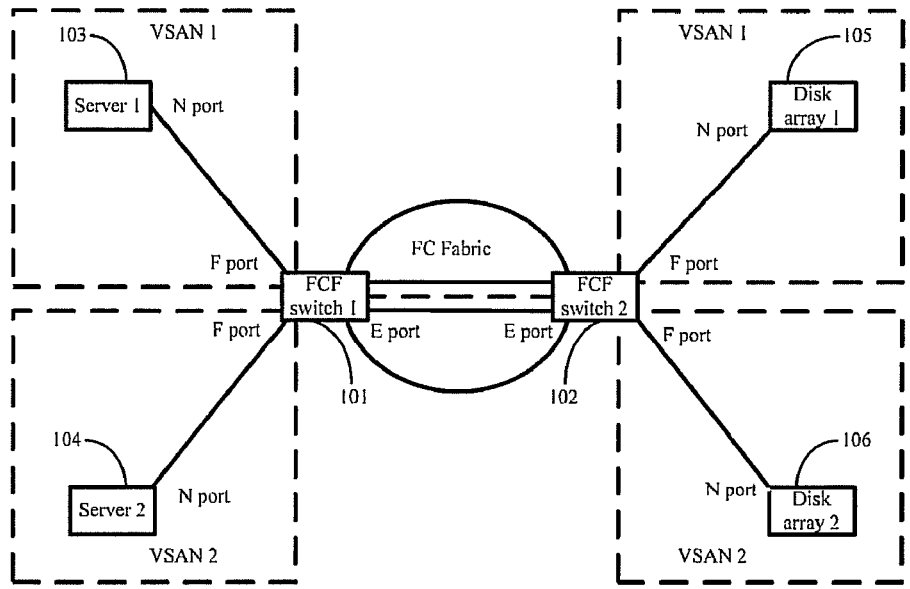
FIG. 1 is a schematic diagram illustrating the FCoE network in the conventional art.
Figure 2A:
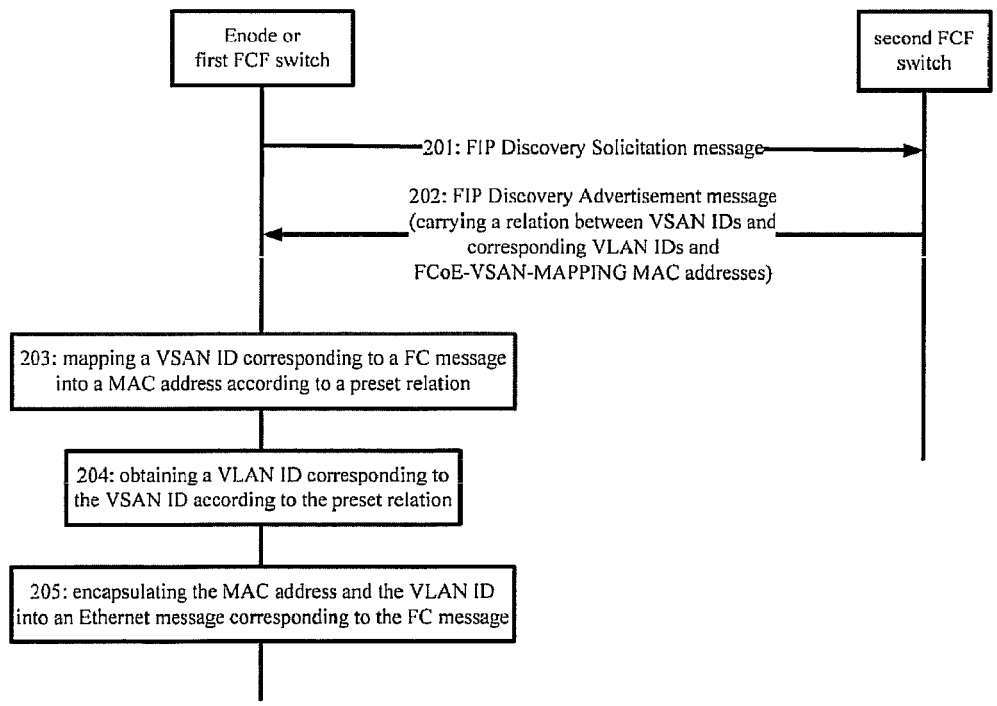
FIG. 2a is a flowchart illustrating the method for allocating VLAN resources according to one example.

Referring to FIG. 2a, FIG. 2a is a flowchart illustrating a method for allocating VLAN resources according to one example. The method includes: mapping, by a first device, a virtual storage area network identity (VSAN ID) corresponding to a fibre channel (FC) message into a media access control (MAC) address according to a preset relation; obtaining, by the first device, a VLAN ID corresponding to the VSAN ID according to the preset relation; and encapsulating, by the first device, the MAC address and the VLAN ID into an Ethernet message corresponding to the FC message; wherein the preset relation is used for mapping multiple VSAN IDs, which correspond to the same VLAN ID, into different MAC addresses. It should be pointed out that the first device is an FCoE device, which may for instance be a FCF switch or an ENode.

Further, during the FIP interaction procedure between an FCF switch and an ENode, or between a first FCF switch and a second FCF switch, the relation between VSAN IDs and corresponding VLAN IDs and FCoE-VSAN-MAPPING MAC addresses is transmitted via an FIP message, thereby mapping multiple VSANs into the same VLAN.

Specifically, the procedure shown in FIG. 2a includes the following steps:

Step 201: a first device, that is an ENode or a first FCF switch, transmits an FIP discovery solicitation message to a second device (i.e., a second FCF switch). Here, the ENode or the first FCF switch is an adjacent device of the second FCF switch. In practical application, devices adjacent to each other may be directly connected via a fibre.

Step 202: the second FCF switch feeds a FIP discovery advertisement message back to the ENode or the first FCF switch after receiving the HP discovery solicitation message, wherein the FiP discovery advertisement message carries the preset relation between VSAN IDs and corresponding VLAN IDs and FCoE-VSAN-MAPPING MAC addresses.

It should be pointed out that the relation may be set beforehand in the second FCF switch. The second FCF switch may provide a relation relating to VSAN IDs indicated in the FIP discovery solicitation message to the ENode or the first FCF switch via the FIP discovery advertisement message. In one example, the second FCF switch may provide a relation relating to all VSAN IDs stored in the second FCF switch itself via the FIP discovery advertisement message. In another example, the second FCF switch provides a relation relating to some of the VSAN IDs according to real demand via the FIP discovery advertisement message. For example, an FIP discovery solicitation message received from an E port carries VSAN IDs, and the second FCF switch may feed back a relation relating to the VSAN IDs carried in the FIP message. In another example, an FIP discovery solicitation message received from an F port may not include a VSAN ID. However, since each F port only connects with one VSAN, a second FCF switch that received the FIP discovery solicitation message determines the VSAN ID configured for the F port and feeds back a relation relating to the VSAN ID.

Figures 2B, 3:
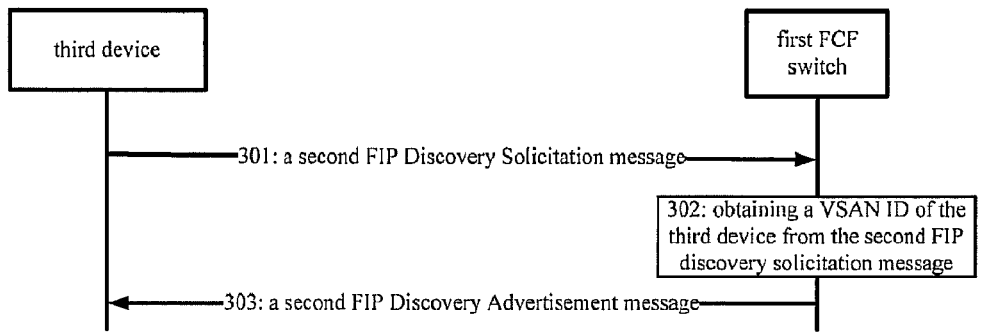
FIG. 2b is a flowchart illustrating the method for allocating VLAN resources according to another example.
FIG. 3 is a schematic diagram illustrating an FCoE-VSAN-MAPPING descriptor according to one example.

In one example, in order to carry a relation between VSAN IDs and corresponding VLAN IDs and FCoE-VSAN-MAPPING MAC addresses as described in Step 202, a FCoE-VSAN-MAPPING descriptor is newly added into an FIP message. Referring to FIG. 3, FIG. 3 is an example of an FCoE-VSAN-MAPPING descriptor. In the descriptor as shown in FIG. 3, Type denotes the type of the descriptor and has a value of 0fH; Length denotes the length of the descriptor; Map Number denotes the number of relations included in the descriptor. Specifically, three groups of relation between VSAN IDs and corresponding VLAN IDs and FCoE-VSAN-MAPPING MAC addresses are included in the descriptor as shown in FIG. 3, that is the value of Map Number is 3, wherein an FCoE-VSAN-MAPPING MAC address has a length of 24 bits. Of course, other forms of descriptor can be adopted for carrying a relation between VSAN IDs and corresponding VLAN IDs and FCoE-VSAN-MAPPING MAC addresses.

In the above example, the relation between VSAN IDs and corresponding VLAN IDs and FCoE-VSAN-MAPPING MAC addresses is carried in an FIP discovery advertisement message for sending. Certainly, the relation can be carried in any other FIP messages for sending instead.

Step 203: when the ENode or the first FCF switch encapsulates an FC message into an Ethernet message, the ENode or the first FCF switch maps an FC-ID of the FC message into a MAC address according to the relation provided by the second FCF switch, and uses the MAC address as an address of the Ethernet message.

Specifically, the mapping in Step 203 can be: searching the relation according to the VSAN ID contained in the FC message, and obtaining an FCoE-VSAN-MAPPING MAC mapping address corresponding to the VSAN ID, setting the FC-ID of the FC message as low 24 bits of the MAC address, and setting the FCoE-VSAN-MAPPING MAC address as high 24 bits of the MAC address to form a required MAC address. In practical application, as to an ENode, the FC message is generated by the ENode itself; as to a first FCF switch, the FC message can be generated by the first FCF switch itself or received from its adjacent ENodes.

Further, the ENode or the first FCF switch may lookup the relation according to the VSAN ID contained in the FC message, obtain a VLAN ID corresponding to the VSAN ID, and add the VLAN ID into an Ethernet message before transmitting or forwarding the Ethernet message.

It should be pointed out that step 201 in the procedure of FIG. 2a is optional in practical application. For example, the second FCF switch can actively provide an updated preset relation of VSAN Ds to its adjacent ENodes or first FCF switch via a FIP discovery advertisement message and so forth when the preset relation of VSAN IDs stored in the second FCF switch changes. Of course, step 202 in the procedure of FIG. 2a is also optional in practical application. That is, instead of using a relation obtained from the FIP discovery advertisement message provided by the second FCF switch, the first FCF switch could use a relation preset by itself without obtaining the relation from an FIP message.

In addition, as shown in FIG. 2b, the first FCF switch may transmit a FIP discovery advertisement message to a third device for providing the relation preset by the first FCF switch to the third device. The procedure is as follows.

Step 301: the third device transmits a second FIP discovery solicitation message to the first FCF switch.

Step 302: the first FCF switch obtains a VSAN ID of the third device according to the second FIP discovery solicitation message.

Step 303: the first FCF switch transmits to the third device the preset relation of the VSAN ID corresponding to the third device via a second FIP discovery advertisement message.

Here, the third device can be an ENode or FCF switch adjacent to the first FCF switch, for example, the third device can be the second FCF switch shown in FIG. 2a. That is, the first FCF switch may also send a FIP discovery advertisement message carrying a preset relation to the second FCF switch after receiving a FIP discovery solicitation message from the second FCF switch.

Further, a fibre channel over Ethernet (FCoE) device is provided as an example.

Figure 4:
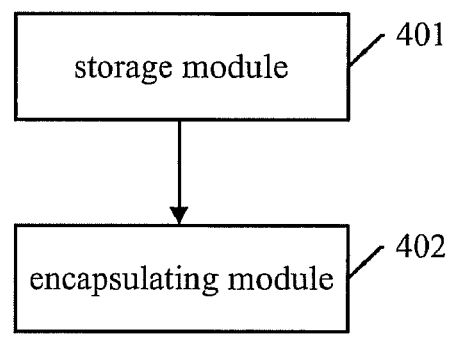
FIG. 4 is a schematic diagram illustrating an FCoE device according to one example.

As shown in FIG. 4, the FCoE device includes: a storage module 401, adapted for storing a preset relation, wherein the preset relation is used for mapping multiple VSAN IDs, which correspond to the same VLAN ID, into different MAC addresses; and an encapsulating module 402, adapted for mapping a VSAN ID corresponding to a fibre channel (FC) message into a MAC address according to the preset relation, obtaining a VLAN ID corresponding to the VSAN ID according to the preset relation, and encapsulating the MAC address and the VLAN ID into an Ethernet message corresponding to the FC message.

Figure 5:
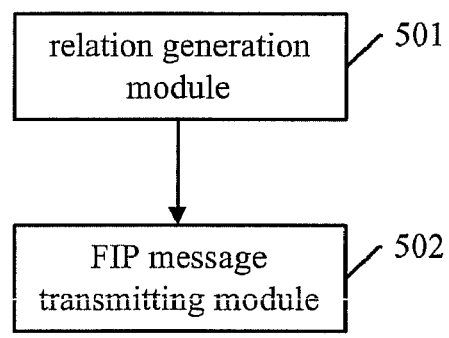
FIG. 5 is a schematic diagram illustrating an FCF switch according to one example.

FIG. 5 is a schematic diagram illustrating an FCF switch according to one example.

The FCF switch includes: a relation generation module 501, adapted for generating a preset relation between VSAN IDs and corresponding VLAN IDs and MAC mapping addresses; and an FIP message transmitting module 502, adapted for transmitting to an adjacent device of the FCF switch (i.e.

the FCoE device shown in FIG. 4) the preset relation via an FIP discovery advertisement message, in order to map multiple VSANs, to which the adjacent device belongs, into the same VLAN. For example, as to multiple VSAN IDs corresponding to the same VLAN ID, different MAC mapping addresses are allocated to the multiple VSAN IDs for preventing message address conflict for the multiple VSANs within an Ethernet.

Specifically, the FIP message transmitting module 502 is adapted for transmitting the FIP discovery advertisement message carrying a predefined descriptor to the FCoE device, wherein the predefined descriptor includes the preset relation. It should be pointed out that the specific operation of the FCF switch shown in FIG. 5 is the same as or similar to that depicted in FIG. 2a for the second FCF switch.

Further, an FCoE system in one example includes an FCoE device as shown in FIG. 4, and an FCF switch shown in FIG. 5, wherein the FCoE device and the FCF switch are adjacent to each other. Specifically, the FCoE device is adapted for mapping the VSAN ID corresponding to the FC message into a MAC address, and using the MAC address as an address of the Ethernet message. Further, the FC-ID of the FC message is also used during the mapping.

In the above described method of allocating VLAN resources, the VSAN IDs of FC messages are mapped into different MAC addresses according to a preset relation, and the MAC addresses are encapsulated into corresponding Ethernet messages of the FC messages. For example, different MAC mapping addresses may be allocated for different VSAN IDs, which correspond to the same VLAN ID, and a MAC address obtained from a MAC mapping address, thereby assigning different VSANs into a VLAN to save VLAN resources. Meanwhile, since a combination of VLAN ID and FCoE-VSAN-MAPPING MAC address is used to distinguish and identify different VSANs, the issue of MAC address overlap within a VLAN can be avoided. Further, in an FIP interaction procedure, an FIP message can be used for carrying and transmitting a relation between VSAN IDs and corresponding VLAN IDs and MAC mapping addresses.

In one exemplary method of allocating VLAN resources, multiple VSANs are mapped into a VLAN according to a preset relation when FC messages are encapsulated into Ethernet messages, thereby saving VLAN resources in the FCoE system. Further, during an FCoE initialization protocol (FIP) interaction procedure, a relation between VSAN IDs and corresponding VLAN IDs and MAC mapping addresses is carried in an FIP message (such as an FIP discovery advertisement message) for allocating the same VLAN to multiple VSANs without address conflict in the VLAN, thereby saving VLAN resources.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method for allocating virtual local area network (VLAN) resources, comprising:
mapping, by a first device, a virtual storage area network identity (VSAN ID) corresponding to a fibre channel (FC) message into a media access control (MAC) address according to a preset relation;
obtaining, by the first device, a VLAN ID corresponding to the VSAN ID according to the preset relation; and
encapsulating, by the first device, the MAC address and the VLAN ID into an Ethernet message corresponding to the FC message;
wherein the preset relation is used for mapping multiple VSAN IDs, which correspond to the same VLAN ID, into different MAC addresses.

2. The method according to claim 1, wherein the preset relation is between VSAN IDs and corresponding VLAN IDs and MAC mapping addresses; and
mapping by a first device a virtual storage area network identity (VSAN ID) corresponding to a fibre channel (FC) message into a media access control (MAC) address according to a preset relation comprises:
determining the VSAN ID of the FC message;
obtaining from the preset relation a MAC mapping address corresponding to the VSAN ID; and
combining the MAC mapping address and an FC-ID of the FC message to form the MAC address.

3. The method according to claim 2, wherein combining the MAC mapping address and an FC-ID of the FC message to form the MAC address comprises:
setting the FC-ID of the FC message as low bits of the MAC address, and setting the MAC mapping address as high bits of the MAC address.

4. The method according to claim 1, further comprising:
receiving, by the first device, a first fibre channel over Ethernet initialization protocol (FIP) discovery advertisement message, wherein the first FIP discovery advertisement message carries the preset relation.

5. The method according to claim 4, further comprising:
before receiving the first FIP discovery advertisement message, transmitting, by the first device, a first FIP discovery solicitation message including the VSAN ID of the first device to a second device.

6. The method according to claim 5, further comprising:
obtaining, by the first device, a VSAN ID of a third device from a second FIP discovery solicitation message transmitted by the third device, and transmitting to the third device the preset relation of the VSAN ID corresponding to the third device via a second FIP discovery advertisement message.

7. The method according to claim 6, wherein the preset relation of the VSAN ID corresponding to the third device is recorded in a predefined descriptor within the second FIP discovery advertisement message.

8. The method according to claim 5, wherein the first device is an Ethernet node (ENode) or a fibre channel over Ethernet forwarder (FCF); and
the second device is an FCF.

9. A fibre channel over Ethernet (FCoE) device, comprising:
a storage module, adapted for storing a preset relation, wherein the preset relation is used for mapping multiple VSAN IDs, which correspond to the same VLAN ID, into different MAC addresses; and
an encapsulating module, adapted for mapping a VSAN ID corresponding to a fibre channel (FC) message into a MAC address according to the preset relation, obtaining a VLAN ID corresponding to the VSAN ID according to the preset relation, and encapsulating the MAC address and the VLAN ID into an Ethernet message corresponding to the FC message.

10. The FCoE device according to claim 9, wherein the FCoE device is an Ethernet node (ENode) or a fibre channel over Ethernet forwarder (FCF).

11. The FCoE device according to claim 9, wherein the preset relation is between VSAN IDs and corresponding VLAN IDs and MAC mapping addresses; and the encapsulating module is adapted for determining the VSAN ID of the FC message, obtaining from the preset relation a MAC mapping address corresponding to the VSAN ID, setting an FC-ID of the FC message as low bits of the MAC address, and setting the MAC mapping address as high bits of the MAC address.

12. An FCoE system, comprising: an FCoE device as claimed in claim 9 and another device, wherein the another device comprises:

a relation generation module, adapted for generating a preset relation between VSAN IDs and corresponding VLAN Ds and MAC mapping addresses; and an FIP message transmitting module, adapted for transmitting to the FCoE device the preset relation via an FIP discovery advertisement message.

13. The system according to claim 12, wherein the FIP message transmitting module is adapted for transmitting said FIP discovery advertisement message carrying a predefined descriptor to the FCoE device, wherein the predefined descriptor includes said preset relation.

* * * * *